United States Patent [19]

Kreh

[11] Patent Number: 5,073,339

[45] Date of Patent: Dec. 17, 1991

[54] METHOD OF INHIBITING CORROSION AND SCALE FORMATION IN AQUEOUS SYSTEMS

[75] Inventor: Robert P. Kreh, Jessup, Md.

[73] Assignee: W. R. Grace & Co. - Conn, Columbia, Md.

[21] Appl. No.: 571,063

[22] Filed: Aug. 23, 1990

[51] Int. Cl.$^5$ ............................................. C23F 11/12
[52] U.S. Cl. ..................................... 422/15; 210/700; 252/389.22; 252/400.22; 422/16; 562/13
[58] Field of Search ...................... 422/14, 15, 16, 19; 252/389.22, 400.22; 562/13; 210/700

[56] References Cited

U.S. PATENT DOCUMENTS

| | | | |
|---|---|---|---|
| 4,613,445 | 9/1986 | Haack et al. | 422/15 |
| 4,929,778 | 5/1990 | Roling | 252/403 |
| 4,933,472 | 6/1990 | Isomura et al. | 562/13 |
| 4,970,335 | 11/1990 | Isomura et al. | 562/13 |

*Primary Examiner*—Robert J. Warden
*Assistant Examiner*—Timothy M. McMahon
*Attorney, Agent, or Firm*—Howard J. Troffkin

[57] ABSTRACT

A method of inhibiting corrosion of metal surfaces in contact with aqueous solutions and of inhibiting scale formation thereon is provided by introducing and maintaining in the solution certain polyaminopolyphosphonohydroxybenzene sulfonic acid compounds or their alkali or alkaline earth metal salts.

18 Claims, No Drawings 5,073,339

METHOD OF INHIBITING CORROSION AND SCALE FORMATION IN AQUEOUS SYSTEMS

BACKGROUND OF THE INVENTION (1) Field of the Invention

The present invention is directed to a method of inhibiting scale and corrosion in aqueous systems, especially in cooling water systems and their associated equipment.

(2) Description of the Related Art

This invention relates to a method of inhibiting the scale formation on and the corrosion of metal surfaces, such as iron and iron alloys and, in particular, low carbon steel which are part of an aqueous system. Aqueous systems, include, for example, cooling water and related water-handling equipment, such as cooling towers and associated pumps, heat exchangers and heating systems, gas scrubbing systems and other similar equipment and systems. Problems commonly encountered in these systems include not only the electrochemical corrosion of iron and iron alloys which are in contact with the circulating water but also the precipitation of scale-forming calcium salts. These two problems are, in fact, very closely related because methods commonly used to control on of these problems often aggravates the other.

For many years, the most common method of controlling corrosion in aqueous systems was to treat the water with hexavalent chromium salts, such as sodium chromate. At the same time, scaling was prevented by treating the water with mineral acids to maintain a low enough pH to prevent the precipitation of scale-forming calcium salts. In order to reduce the chromate concentration, phosphate and zinc salts have been combined with the chromates to provide good corrosion control.

Environmental concerns over the discharge of even small amounts of hexavalent chromium has caused new methods to be sought that would provide total corrosion inhibition without its use.

Some of the ways include the use of various combinations of zinc salts, phosphates, polyphosphates, and organic phosphonic acid derivatives and their salts. In particular, the use of high concentrations of orthophosphate is well established, but such high concentrations make it necessary to work in the presence of high dosages of anionic dispersants in order to prevent calcium phosphate from fouling. Another inorganic salt, sodium nitrite, is also well known as a corrosion inhibitor, but it is normally necessary to use it in concentrations of 500-1000 ppm which is environmentally unacceptable.

Organic phosphonates have also been extensively used in the inhibition of scale and corrosion in aqueous systems. The use of these compounds is illustrated by U.S. Pat. Nos. 4,640,818 (aminophosphonic acid plus manganese); 4,692,317 (phosphonohydroxyacetic acid plus cationic polymer); 4,671,934 (aminophosphonic acid/phosphate mixtures); and 4,085,134, 4,212,734 and 4,229,294 (all directed to alkyl phosphonic-sulfonic acids).

It is highly desired to provide a means to readily treat aqueous systems which are susceptible to corrosion and scale formation in a manner which inhibits both of these adverse conditions. It is further desired to provide a means to inhibit corrosion and scale formation under a wide range of water conditions. Finally, it is desired to provide a means to inhibit corrosion and scale formation in an environmentally acceptable manner.

SUMMARY OF THE INVENTION

The present invention is directed to a method of treating aqueous systems in a manner which causes both inhibition of scale formation and of corrosion. In particular, the present invention is directed to the treatment of aqueous systems with certain polyamino-polyphosphono-hydroxybenzene sulfonic acid compounds, which are fully described herein below.

DETAILED DESCRIPTION OF THE INVENTION

The present invention is directed to a method of treating aqueous systems in a manner which provides inhibition of both scale formation and corrosion.

The present process requires introducing into the aqueous system at least one polyamino-polyphosphono-hydroxybenzenesulfonic acid compound selected from 3,5-bis(1,1-diphosphonoalkylaminomethyl)-4-hydroxybenzenesulfonic acid (I) or 3-(1,1-diphosphonoalkylaminomethyl)-4-hydroxybenezenesulfonic acid (II) or mixtures thereof. These compounds can be used as the free acid or as an alkali metal or alkaline earth metal salt (preferably sodium or potassium). These compounds I and II are represented by the formulas:

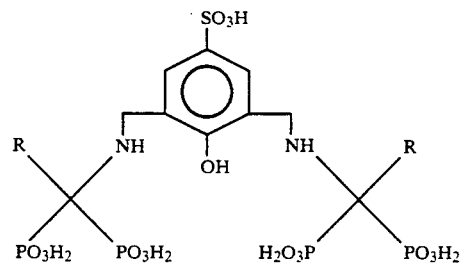

and

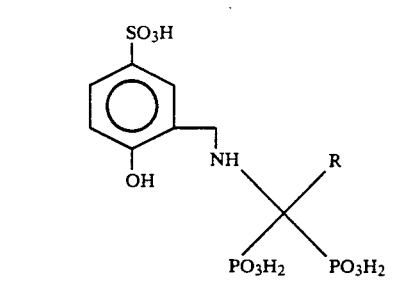

wherein R can be selected from hydrogen, methyl or ethyl (preferably methyl). These compounds and the method of forming them are disclosed in our copending U.S. application Ser. No. 554,041, filed July 13, 1990, the teachings of which are incorporated herein by reference.

The subject compounds can be formed from 4-phenolsulfonic acid, formaldehyde and a 1,1-diphosphonoalkylamine by contacting the reactants together in an inert solvent under basic conditions. Compound I requires the molar ratio of reactants to be 1:2 2 and for Compound II the ratio is limited to 1:1-1.5:1-1.5.

Compound I and II are introduced into the aqueous system in an amount to effectively inhibit both scale formation and corrosion within the system. The exact amount will depend upon the hardness of the system and can be readily determined by limited experimentation.

The method of this invention for inhibiting corrosion of iron and iron-based metals which are in contact with aqueous systems comprises maintaining in the aqueous liquid from 0.1 to 50,000 parts per million ("ppm"), preferably 1, to 10,000 ppm and most preferably 5 to 2,000 ppm of at least one of the above-described compounds. These compounds, either singly or in combination, can be added to the water by conventional bypass feeder using briquettes containing the treatment, by addition as dry powder to the water, or as an aqueous feed solution containing at least one of the treatment compounds.

The subject corrosion and scale inhibiting agent or combination of agents can be readily dissolved in the aqueous medium. The medium may, in addition, contain other known agents for water treatment, such as additional chelants, scale inhibitors, pH regulating agents, dispersants, biocides and the like. Examples of chelants are N,N,N',N'-ethylenediamine tetraacetic acid and N,N'-bis(2-hydroxybenzyl)ethylenedinitrilo-N,N'-diacetic acid. Examples of pH regulating agents are acid (e.g., $H_2SO_4$) base (e.g., NaOH), and various buffers (e.g., phosphate or borate). Examples of scale inhibitors are organophosphonates and polyacrylates. Examples of dispersants include carboxylate and sulfonate containing polymers. Examples of biocides are chlorine- and bromine-containing materials and quaternary ammonium salts. These agents can be present in effective amounts commonly known to those in this art. Normally, these agents can be present in from 0.1 to 10 (preferably from 0.5 - 2) times the amount of the subject agents present in the system.

The compounds found useful in the process of this invention are relatively non-toxic and prevent corrosion of ferrous metals in contact with aqueous liquids. These compounds can be used for partial or complete substitution of chromate-based corrosion inhibitors previously used. The subject compounds can also be used for partial or complete substitution of conventional phosphate and/or organophosphonate inhibitors to minimize scaling and/or environmental detriments associated with the use of these phosphorous-based inhibitors. Likewise, these compounds can be used to replace all or part of the zinc based inhibitors used in some corrosion inhibitor formulations, yielding a more environmentally-acceptable formulation and minimizing zinc fouling at high pH. These substituted compounds provide a more economically viable additive over the use of molybdates.

The present method has been found to inhibit corrosion and to prevent and/or remove scale (especially iron and calcium deposits) from aqueous systems under a wide variety of conditions. The subject agents are effective in aqueous systems wherein the water has a pH of from about 5 to about 10 and even higher. It is particularly effective at high pH (greater than 8) where other agents decompose, are inactive, or have limited solubility. Further, the subject agents are effective in aqueous systems wherein the water is low in hardness as well as water having very high hardness levels. The subject agents are soluble and effective in aqueous system having high hardness of 100 to 1000 ppm (expressed as calcium carbonate). The effectiveness of the instant agents over these wide range of conditions provides an improved mode of inhibition as the applicator does not have to be concerned with changes in conditions of the system being treated.

The following examples are given for illustrative purposes only and are not meant to be a limitation on the invention, as defined by the appended claims. All parts and percentages are by weight unless otherwise stated.

EXAMPLE 1

Preparation of the Metallic Ion Chelating Compound 8.0 parts of 4-hydroxybenzenesulfonic acid, sodium salt dihydrate, 16.0 parts 1,1-diphosphonoethylamine, 7.0 parts aqueous formaldehyde (37%) and 50.0 parts water were combined in a glass reaction vessal. The pH was adjusted to 7.5 with 25.0 parts of 45% KOH. The resultant solution was stirred and heated at 60° C. for 16 hours. Analysis of the product by NMR (Nuclear Magnetic Resonance) indicated a yield of 70% of 3,5-bis(1,1-diphosphonoethylaminomethly)-4-hydroxybenzenesulfonic acid, 20% of 3-(1,1-diphosphonoethylaminomethyl)-4-hydroxybenzenesulfonic acid.

EXAMPLE 2

Determination of the Effectiveness of the Metallic Ion Chelatinq Compound of Example 1 for Preventing Corrosion and Iron Scale Formation A solution (900 ml) containing 99 ppm $CaSO_4$, 18 ppm $CaCl_2$, 55 ppm $MgSO_4$ and 176 ppm $NaHCO_3$ was prepared. To this solution was added 30 ppm of the product mixture prepared according to Example 1. The pH was adjusted to 8.5, and the solution was stirred at 54° C. with a mild steel coupon for 24 hours. The coupon was then cleaned with steel wool, dried and then weighed. The weight loss corresponded to a corrosion rate of 6 mils per year (mpy). Without the addition of the product mixture of Example 1, the corrosion rate was 60 mpy.

The resultant solution from the above test was filtered through a 0.2 micron membrane and analyzed for soluble iron. The result was 5.8 ppm Fe, compared to 0.0 ppm soluble iron in the absence of this product mixture. This demonstrates the ability of this product to limit formation of insoluble iron scale.

EXAMPLE 3

Determination of the Effectiveness of the Metallic Ion Chelating Compound of Example 1 as a Scale Formation Inhibitor The ability to prevent the precipitation of scale-forming calcium salts, particularly calcium carbonate, was determined as follows.

A solution (100 ml) containing 1188 ppm $CaSO_4$, 156 ppm $CaCl_2$, 660 ppm $MgSO_4$ and 2112 ppm $NaHCO_3$ was prepared. To this solution was added 10 ppm of the product mixture prepared according to Example 1. The pH was adjusted to 8.0 and the solution was shaken at 300 rpm at 60° C. for 24 hours. The final solution pH was 8.1. The final (clear) solution was filtered through a 0.2 micron membrane, and the filtered solution was analyzed at 380 ppm calcium. (Initial calcium concentration was 384 ppm.) Without the addition of the product mixture of Example 1, the final (cloudy) solution had a pH of 7.1, and when filtered it analyzed for 85 ppm Ca.

What is claimed:

1. A method of inhibiting scale and corrosion formation from metal surfaces in contact with aqueous solutions comprising introducing into said aqueous solution a polyamino-polyphosphono-hydroxybenzenesulfonic acid agent selected from compounds of the formula:

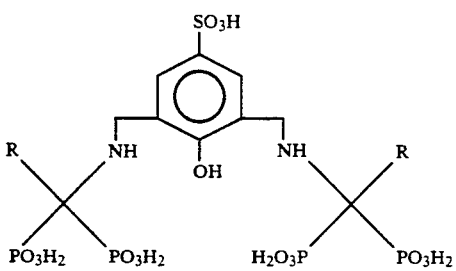

and

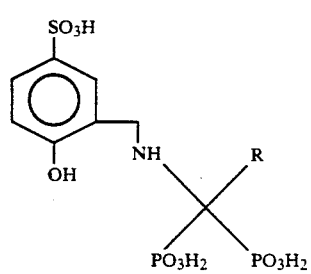

wherein R represents hydrogen, methyl or ethyl, mixtures of said compounds and their alkali metal or alkaline earth metal salts, and maintaining said agent in said aqueous solution in concentrations of from about 0.1 to 50,000 ppm.

2. The method of claim 1 wherein the agent is compound I.

3. The method of claim 1 wherein the agent is compound II.

4. The method of claim 1 wherein the agent is a mixture of compounds I and II.

5. The method of claim 1 wherein the agent is maintained in the aqueous solution in concentrations of from about 0.1 to about 10,000 ppm.

6. The method of claim 2 wherein the agent is maintained in the aqueous solution in concentrations of from about 0.1 to about 10,000 ppm.

7. The method of claim 3 wherein the agent is maintained in the aqueous solution in concentrations of from about 0.1 to about 10,000 ppm.

8. The method of claim 4 wherein the agent is maintained in the aqueous solution in concentrations of from about 0.1 to about 10,000 ppm.

9. The method of claim 1 wherein the aqueous solution has a pH of from about 5 to about 10.

10. The process of claim 1 wherein the aqueous solution has a calcium concentration of from about 100 to 1000 ppm hardness as calcium carbonate.

11. The process of claim 9 wherein the aqueous solution has a calcium concentration of from about 100 to 1000 ppm hardness as calcium carbonate.

12. The method of claim 1 wherein the aqueous system further contains at least one water treatment agent other than said polyamino-polyphosphono-hydroxy-benzene-sulfonic acid agents.

13. The method of claim 4 wherein the aqueous system further contains at least one water treatment agent other than said polyamino-polyphosphono-hydroxy-benzene-sulfonic acid agents.

14. The method of claim 5 wherein the aqueous system further contains at least one water treatment agent other than said polyamino-polyphosphono-hydroxy-benzene-sulfonic acid agents.

15. The method of claim 1 wherein the hydroxybenzenesulfonic acid compound is maintained at a concentration of from about 5 to about 2000 ppm in the aqueous solution.

16. A method of inhibiting corrosion of iron based metal which is in contact with an aqueous system comprising maintaining in the aqueous system at least one first agent selected from phosphates, organophosphonates, chromates, molybdates, azoles and zinc in combination with at least one second agent wherein said second agent is a polyamrno-polyphosphono-hydroxybenzenesulfonic acid compound represented by the formula

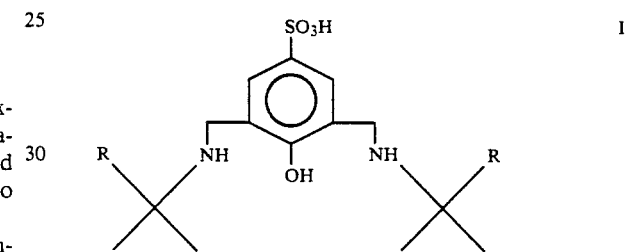

and

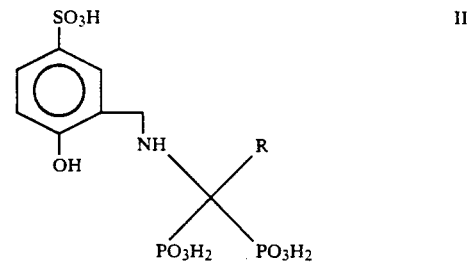

wherein R represents hydrogen, methyl or ethyl, mixtures of said compounds and their alkali metal or alkaline earth metal salts, and maintaining said agent in said aqueous solution in concentrations of from about 0.1 to 50,000 ppm said first agent and said second agent are present in a weight ratio of 0.1 to 10.

17. The method of claim 16 wherein the hydroxybenzenesulfonic acid compound is present in from 1 to 10,000 ppm concentration in the aqueous system.

18. The method of claim 16 wherein the hydroxybenzenesulfonic acid compound is present in from 1 to 2,000 ppm concentration in the aqueous system.

* * * * *